US012801308B2

(12) United States Patent
Morley et al.

(10) Patent No.: US 12,801,308 B2
(45) Date of Patent: Nov. 17, 2026

(54) SYSTEM AND METHOD FOR REDUCING CPU MEMORY DEMANDS IN DATA STORAGE SYSTEMS

(71) Applicant: Dell Products L.P., Round Rock, TX (US)

(72) Inventors: Steven A. Morley, Mendon, MA (US); Amitai Alkalay, Kadima (IL); Samuel L. Mullis, II, Raleigh, NC (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/428,576

(22) Filed: Jan. 31, 2024

(65) Prior Publication Data

US 2025/0244913 A1 Jul. 31, 2025

(51) Int. Cl.

| | |
|---|---|
| ***G06F 12/08*** | (2016.01) |
| ***G06F 3/06*** | (2006.01) |
| ***G06F 12/0808*** | (2016.01) |
| ***G06F 12/0815*** | (2016.01) |

(52) U.S. Cl.

CPC .......... *G06F 3/0656* (2013.01); *G06F 3/0658* (2013.01); *G06F 3/0679* (2013.01); *G06F 3/0604* (2013.01)

(58) Field of Classification Search

CPC ..... G06F 3/0656; G06F 3/0658; G06F 3/0679

USPC .......................................................... 711/154

See application file for complete search history.

(56) References Cited

U.S. PATENT DOCUMENTS

| | | | | |
|---|---|---|---|---|
| 8,407,407 B1 * | 3/2013 | Adler | G06F 3/0659 | 711/158 |
| 2002/0191867 A1 * | 12/2002 | Le | G06F 3/0485 | 382/300 |
| 2006/0098730 A1 * | 5/2006 | Tsuruta | H04N 19/423 | 375/E7.094 |
| 2009/0259789 A1 * | 10/2009 | Kato | G06F 13/28 | 710/308 |
| 2012/0260009 A1 * | 10/2012 | Lu | G06F 3/0679 | 710/52 |
| 2015/0149698 A1 * | 5/2015 | Cai | G06F 3/065 | 711/103 |
| 2018/0188952 A1 * | 7/2018 | Carlton | G06F 3/0679 | |
| 2019/0141167 A1 * | 5/2019 | Nolan | G06N 20/00 | |
| 2020/0151070 A1 * | 5/2020 | Lee | G11C 29/42 | |
| 2021/0142438 A1 * | 5/2021 | Appu | G06T 1/20 | |
| 2022/0137835 A1 * | 5/2022 | Malakapalli | G06F 3/065 | 714/6.22 |
| 2022/0206975 A1 * | 6/2022 | Gopal | G06F 12/1081 | |

* cited by examiner

*Primary Examiner* — Mohamed M Gebril

(74) *Attorney, Agent, or Firm* — Brian J. Colandreo; Heath M. Sargeant; Holland & Knight LLP

(57) ABSTRACT

A method, computer program product, and computing system for reducing CPU memory demands in a data storage system. Compressed data is transferred from a storage medium of a storage device to a buffer memory on the storage device. The compressed data is then transferred from the buffer memory to a decompressor device and the compressed data is decompressed by the decompressor device to produce uncompressed data. The uncompressed data is stored in a main memory of a CPU and transferred from the main memory to a requestor of the data.

6 Claims, 4 Drawing Sheets

SYSTEM AND METHOD FOR REDUCING CPU MEMORY DEMANDS IN DATA STORAGE SYSTEMS

BACKGROUND

Historically, server, storage, and high-performance computing (HPC) applications have placed significant demands on CPU memory and I/O compared to desktop applications. The rapid adoption of AI, GPU, Edge, and Telemetry workloads will exacerbate this problem. Storage architectures typically have heavy CPU demand in part, due to the number of times data is accessed and moved in/out of main memory, impacting effective memory bandwidth and CPU cycles.

SUMMARY OF DISCLOSURE

In one example implementation, a computer-implemented method executed on a computing device may include, but is not limited to, transferring compressed data from a storage medium of a storage device to a buffer memory on the storage device, transferring the compressed data from the buffer memory to a decompressor device, decompressing the compressed data by the decompressor device to produce uncompressed data, storing the uncompressed data in a main memory of a CPU, and transferring the uncompressed data to from the main memory to a requestor of the data.

One or more of the following example features may be included. The storage device may include a solid state drive (SSD). The storage medium may include a flash memory. The method may further include performing a CRC check on the uncompressed data stored in the main memory prior to the uncompressed data being transferred to the requestor of the data. The buffer memory on the storage device may include a controller memory buffer. The decompressor device may perform a direct memory access (DMA) transaction to transfer the compressed data from the controller memory buffer to the decompressor device.

In another example implementation, a computer program product resides on a computer readable medium that has a plurality of instructions stored on it. When executed by a processor, the instructions cause the processor to perform operations that may include, but are not limited to, transferring compressed data from a storage medium of a storage device to a buffer memory on the storage device, transferring the compressed data from the buffer memory to a decompressor device, decompressing the compressed data by the decompressor device to produce uncompressed data, storing the uncompressed data in a main memory of a CPU, and transferring the uncompressed data to from the main memory to a requestor of the data.

One or more of the following example features may be included. The storage device may include a solid state drive (SSD). The storage medium may include a flash memory. The method may further include performing a CRC check on the uncompressed data stored in the main memory prior to the uncompressed data being transferred to the requestor of the data. The buffer memory on the storage device may include a controller memory buffer. The decompressor device may perform a direct memory access (DMA) transaction to transfer the compressed data from the controller memory buffer to the decompressor device.

In another example implementation, a computing system includes a memory and a processor configured to perform operations that may include, but are not limited to, transferring compressed data from a storage medium of a storage device to a buffer memory on the storage device, transferring the compressed data from the buffer memory to a decompressor device, decompressing the compressed data by the decompressor device to produce uncompressed data, storing the uncompressed data in a main memory of a CPU, and transferring the uncompressed data to from the main memory to a requestor of the data.

One or more of the following example features may be included. The storage device may include a solid state drive (SSD). The storage medium may include a flash memory. The method may further include performing a CRC check on the uncompressed data stored in the main memory prior to the uncompressed data being transferred to the requestor of the data. The buffer memory on the storage device may include a controller memory buffer. The decompressor device may perform a direct memory access (DMA) transaction to transfer the compressed data from the controller memory buffer to the decompressor device.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
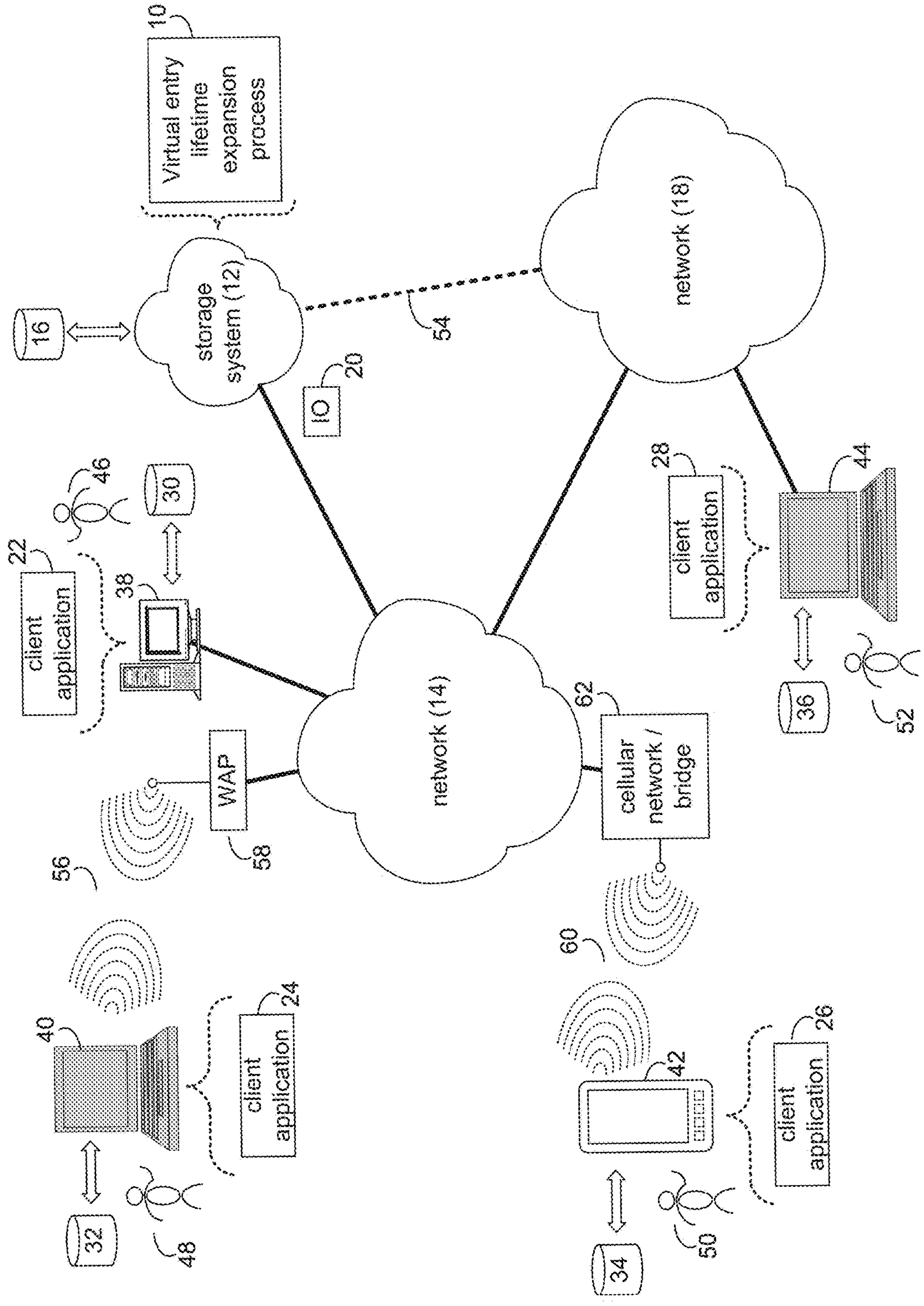
FIG. 1 is an example diagrammatic view of a storage system and a virtual entry lifetime expansion process coupled to a distributed computing network according to one or more example implementations of the disclosure.

System Overview:

Referring to FIG. 1, there is shown virtual entry lifetime expansion process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of disability access assistance process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of disability access assistance process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data deduplication process, such as virtual entry lifetime expansion process 10 of FIG. 1, may include but is not limited to, monitoring a deduplication function of a virtual layer of a data storage system, incrementing a reference count of a virtual entry when a data page is written to the virtual layer, decrementing the reference count of the virtual entry when a data page is deleted from the virtual layer, maintaining the virtual entry in the virtual layer when the reference count reaches a predetermined value, and reclaiming the virtual entry when a predetermined action of the data storage system is to be performed.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Reduced Memory Demand CPU Process

Figure 2:
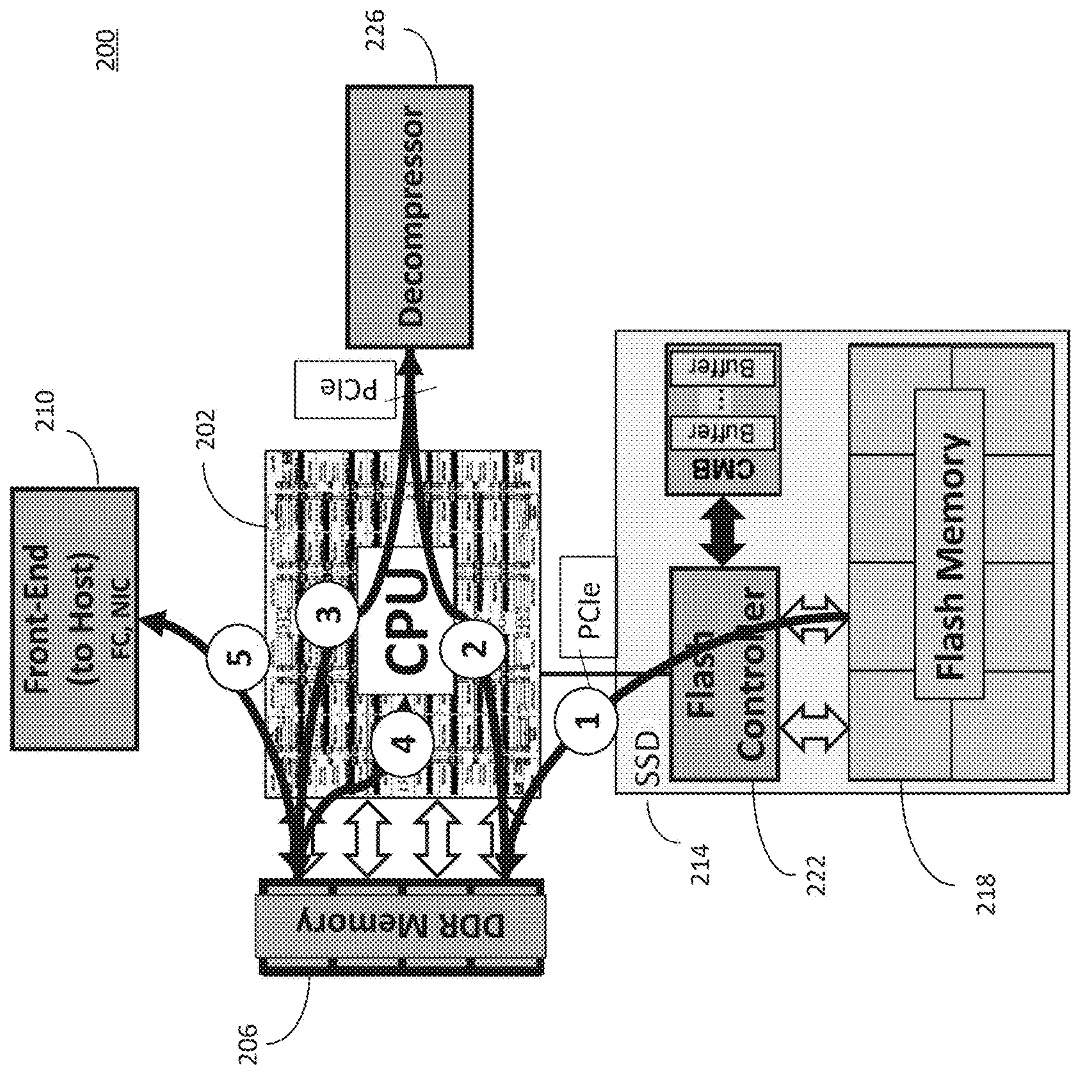
FIG. 2 is an example depiction of a system for decompressing data operating with high CPU demands.

FIG. 2 is an example graphical representation of a system 200 for decompressing data stored on a memory device prior to transferring the data to a requestor of the data from a host device. Device 200 includes a central processing unit (CPU) 202 which includes associated main memory device 206, which may be in the form of double data rate (DDR) memory. A front end 210 transfers data requests and associated data between CPU 202 and appliances that request the data (not shown). A memory device 214, which, for example, may be a solid state drive (SSD) includes flash memory 218 and a flash controller 222. A decompressor device 226 operates in conjunction with the CPU 202 to decompress data stored in flash memory 218 of SSD 214.

Storage architectures such as system 200 typically have heavy CPU demand in part, due to the number of times data is accessed and moved in and out of main memory 206. This impacts the effective memory bandwidth and CPU cycles. The end-to-end flow of data during the processing of a read request from a host/server 210 is as follows, with the tasks 1-5 as indicated in FIG. 2.

1. Compressed data is read from drive 214. The drives in flash memory 218 directly transfer data to the CPU 202 main memory 206 via DMA (Direct Memory Access).
2. The compressed data is loaded from main memory 206 to the decompression device 226 via DMA, where it is decoded.
3. The uncompressed data is then stored back to the main memory 206 via DMA.
4. The uncompressed data is loaded to the CPU 202 for computation and CRC (Cyclic Redundancy Check) verification.

5. The data is then transferred out of main memory 206 from the host server to the requestor of the data, e.g., SCSI, NVMe, Ethernet, RDMA, etc.

In the example of FIG. 2, data is moved in and out of main memory 206 a total of five times, resulting in an 80% loss in effective memory bandwidth. This loss significantly impacts valuable compute cycles. As I/O and solid-state drives (SSDs) continue to double their performance with each generation, techniques to reduce memory movement become crucial to mitigate this impact.

Figure 3:
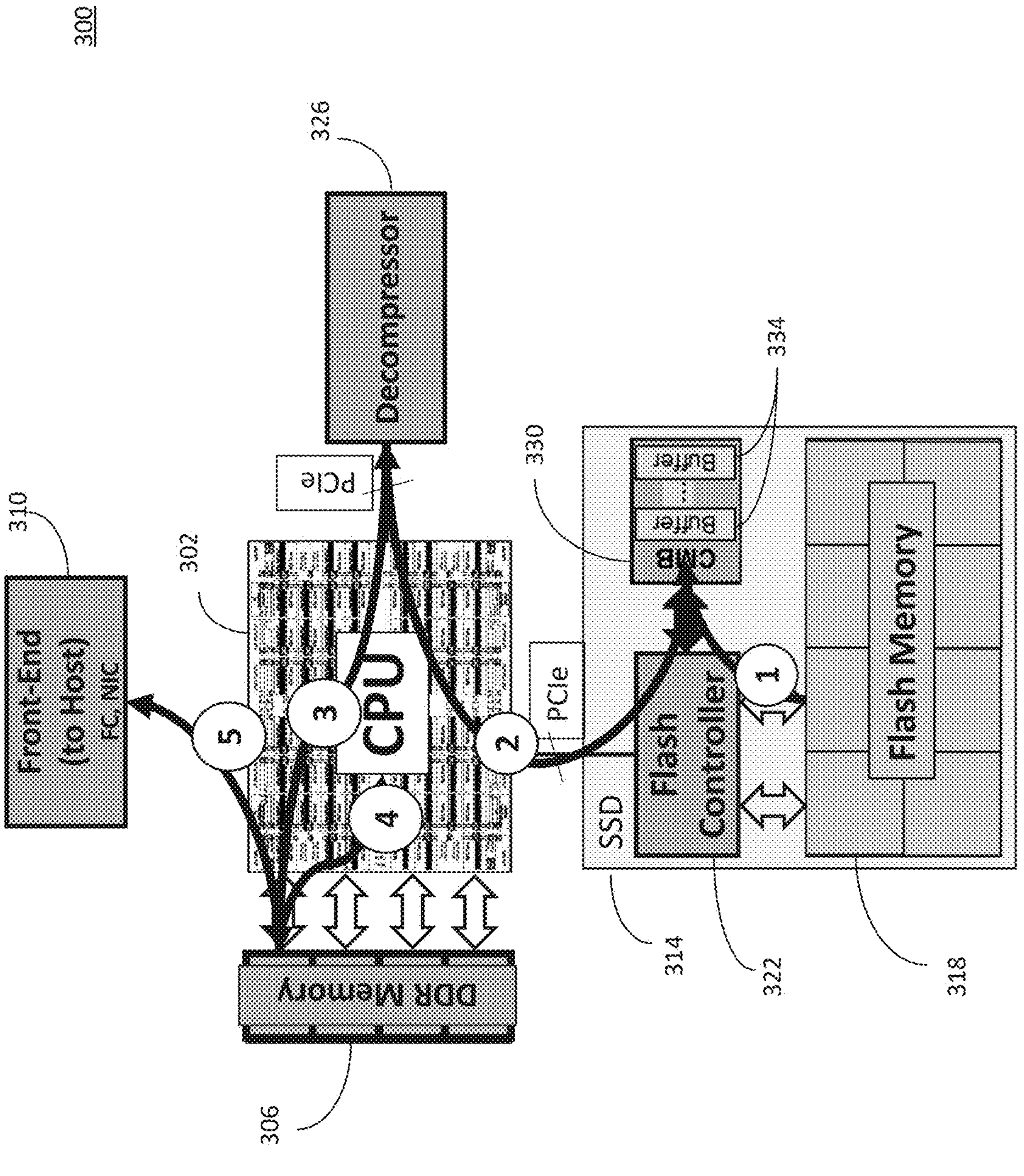
FIG. 3 is an example depiction of a system for decompressing data operating in accordance with an implementation of the disclosure with reduced CPU demands.
Figure 4:
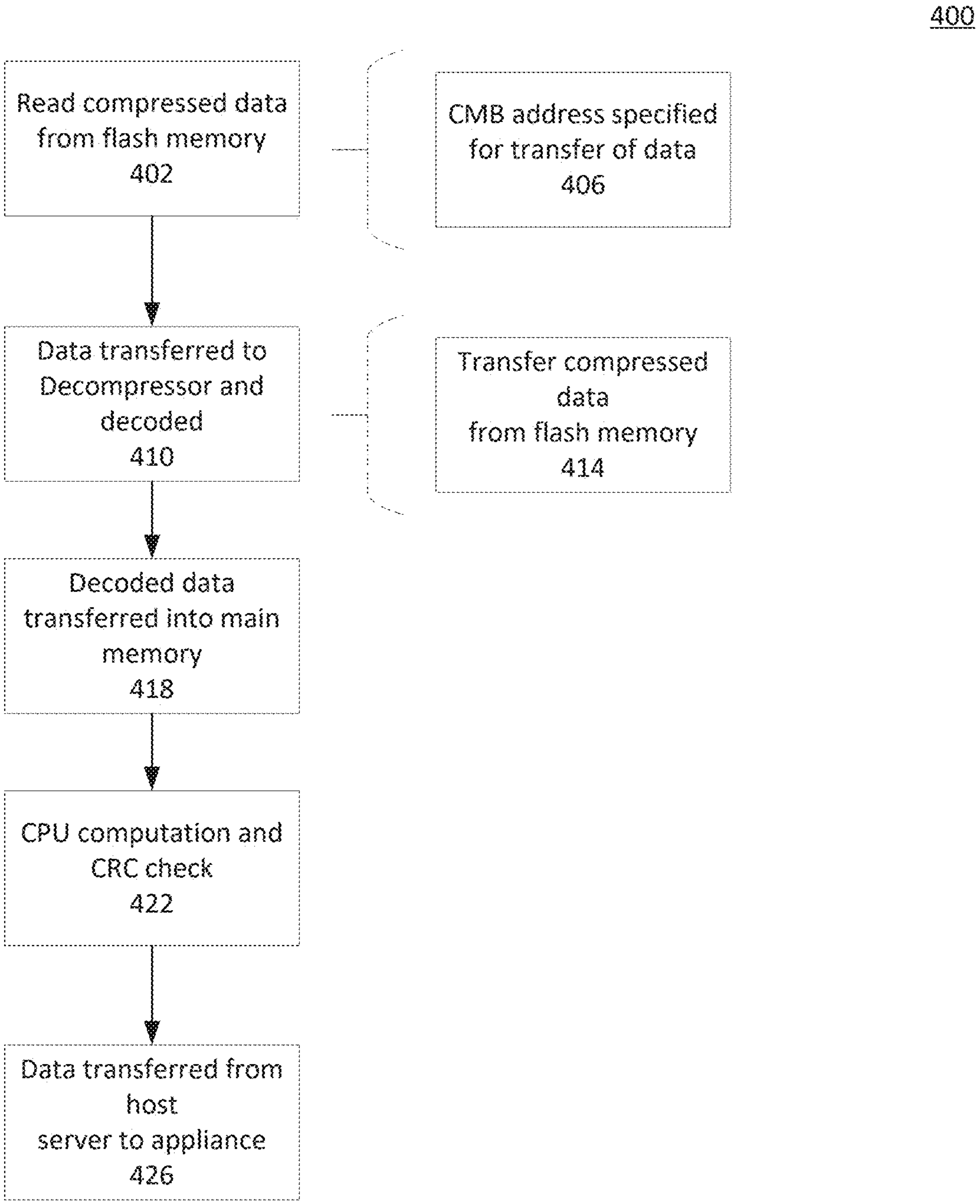
FIG. 4 is an example flowchart of the data decompression process according to one or more example implementations of the disclosure.

Referring now to FIGS. 3 and 4, an example implementation of the disclosure will be described. Device 300 includes a central processing unit (CPU) 302 which includes associated main memory device 306, which may be in the form of double data rate (DDR) memory. A front end 310 transfers data requests and associated data between CPU 302 and appliances that request the data (not shown). A memory device 314, which, for example, may be a solid state drive (SSD) includes flash memory 318 and a flash controller 322. In an example implementation, SSD 314 may be a self-encrypting drive (SED), in which the data stored in the drive is encrypted by the drive itself. A decompressor device 326 operates in conjunction with the CPU 302 to decompress data stored in flash memory 318 of SSD 314. A controller memory buffer (CMB) 330 on the SSD 314 includes a number of buffer registers 334. In this implementation, CMB 330 is a designated region of DDR memory within the SSD device 214. An SSD device driver can locate the physical address of the CMB through, for example, the device's PCIe BAR, for example, the CMBLOC and CMBSZ registers. The driver can then map the CMB's physical address range into the CPU's address space, enabling the CMB to be used as DMA buffers to offload some of the memory movement.

The end-to-end flow of data during the processing of a read request from a host/server 210 is as follows, with the tasks 1-5 as indicated in FIG. 3.

1. Compressed data is read from flash memory 318, 402. An initiator of CPU 202 submits a read command to a submission queue of SSD 314 where the data pointer specifies a physical address of CMB 330 to which the data will be transferred.
2. Decompression: On completion of the read command in task 1, the initiator issues a decompression request to program the decompressor using the same CMB physical address used in task 1 for the source buffer holding the compressed data. The decompressor 326 initiates a DMA transaction, such as a P2P PCIe transaction, to transfer data from the CMB address, 414, and the decompressor 326 then decodes the data.

In a system in which the memory device 314 is an SED, the decryption operation may be performed by the SED memory device 314 either when the data is transferred from the flash memory 318 to the CMB 330 (Task 1 above) or when the data is transferred from the CMB 330 to the decompressor 326 (Task 2 above).

3. The uncompressed data is then transferred to main memory 306, 418. A destination address programmed in the decompression request instructs decompressor 326 to transfer uncompressed data to the main memory 306.
4. A CPU computation and CRC check is then performed by the CPU 302, 422. The uncompressed data is loaded to the CPU 302 for computation and CRC verification.
5. The uncompressed and CRC checked data is then transferred from a host server to the requestor of the data, e.g., over NVMe, SCSI, SATA, etc., 426.

By staging data in the CMB 330 of SSD 314, the need for perform DMA operations to/from main memory 306 in steps one and two mentioned above with regard to FIG. 2 is eliminated. The disk read command is programmed to DMA data directly to the CMB 330 of SSD 314. Then, the decompressor 326 is programmed to DMA data from the CMB 330, decode it, and store the uncompressed results into the main memory. This eliminates the intermediate transfers of data to and from main memory 306.

This reduction from 5× in/out of main memory to 3× demonstrates a significant savings in data movement by leveraging advancements in I/O, for example, PCIe gen 5 & 6, bus bandwidth.

Based on the foregoing, an example implementation of the disclosure provides a process for transferring compressed data from a flash drive of an SSD to a decompressor without first storing the compressed data in the main memory 306 of CPU 302. Since the compressed data is transferred from the CMB 330 to the decompressor 326, bandwidth demands on the CPU 302 are reduced from the configuration shown in FIG. 2.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:

transferring compressed data from a flash memory of a solid state drive (SSD) storage device internally within the SSD storage device to an address within a controller memory buffer on the SSD storage device, wherein the SSD storage device is a self-encrypting drive (SED) and includes at least the flash memory, a flash controller, and the controller memory buffer;

transferring the compressed data from the controller memory buffer to a decompressor device by initiating a direct memory access (DMA) transaction by the decompressor to transfer the compressed data from the address of the controller memory buffer directly to the decompressor device, wherein the DMA transaction is a peer-to-peer PCIe transaction between the decompressor and the SSD storage device, and wherein the decompressor is separate from the SSD storage device;

decompressing the compressed data by the decompressor device to produce uncompressed data;

storing the uncompressed data in a main memory of a CPU, wherein the CPU and the main memory are separate from the decompressor and the SSD storage device; and transferring the uncompressed data from the main memory to a requestor of the data.

2. The computer-implemented method of claim 1 further including performing a CRC check on the uncompressed data stored in the main memory prior to the uncompressed data being transferred to the requestor of the data.

3. A computer program product residing on a non-transitory computer readable medium having a plurality of instructions stored thereon which, when executed by a processor, cause the processor to perform operations comprising:

transferring compressed data from a flash memory of a solid state drive (SSD) storage device internally within the SSD storage device to an address within a controller memory buffer on the SSD storage device, wherein the SSD storage device is a self-encrypting drive (SED) and includes at least the flash memory, a flash controller, and the controller memory buffer;

transferring the compressed data from the controller memory buffer to a decompressor device by initiating a direct memory access (DMA) transaction by the decompressor to transfer the compressed data from the address of the controller memory buffer directly to the decompressor device, wherein the DMA transaction is a peer-to-peer PCIe transaction between the decompressor and the SSD storage device, and wherein the decompressor is separate from the SSD storage device;

decompressing the compressed data by the decompressor device to produce uncompressed data;

storing the uncompressed data in a main memory of a CPU, wherein the CPU and the main memory are separate from the decompressor and the SSD storage device; and transferring the uncompressed data from the main memory to a requestor of the data.

4. The computer program product of claim 3 further including performing a CRC check on the uncompressed data stored in the main memory prior to the uncompressed data being transferred to the requestor of the data.

5. A computing system comprising:

a memory; and a processor configured to:

transfer compressed data from a flash memory of a solid state drive (SSD) storage device internally within the SSD storage device to an address within a controller memory buffer on the SSD storage device, wherein the SSD storage device is a self-encrypting drive (SED) and includes at least the flash memory, a flash controller, and the controller memory buffer;

transfer the compressed data from the controller memory buffer to a decompressor device by initiating a direct memory access (DMA) transaction by the decompressor to transfer the compressed data from the address of the controller memory buffer directly to the decompressor device, wherein the DMA transaction is a peer-to-peer PCIe transaction between the decompressor and the SSD storage device, and wherein the decompressor is separate from the SSD storage device;

decompress the compressed data by the decompressor device to produce uncompressed data;

store the uncompressed data in a main memory of a CPU, wherein the CPU and the main memory are separate from the decompressor and the SSD storage device; and transfer the uncompressed data from the main memory to a requestor of the data.

6. The computing system of claim 5 further including performing a CRC check on the uncompressed data stored in the main memory prior to the uncompressed data being transferred to the requestor of the data.

* * * * *